United States Patent
Konrad

[15] 3,656,039
[45] Apr. 11, 1972

[54] DIRECT CURRENT CONTROL CIRCUIT
[72] Inventor: Charles E. Konrad, Roanoke, Va.
[73] Assignee: General Electric Company
[22] Filed: Sept. 21, 1970
[21] Appl. No.: 73,724

[52] U.S. Cl............................318/138, 318/296, 318/345, 318/375, 318/506, 318/507, 321/45 C
[51] Int. Cl..............................................H02p 29/02
[58] Field of Search..................321/45 C, 43, 44; 318/341, 318/345, 346, 138, 505, 506, 507, 296, 375

[56] References Cited

UNITED STATES PATENTS

| | | | |
|---|---|---|---|
| 3,560,817 | 2/1971 | Amato | 318/138 |
| 3,348,114 | 10/1967 | Wright, Jr. et al. | 318/375 X |
| 3,119,957 | 1/1964 | Alexanderson | 318/296 X |

FOREIGN PATENTS OR APPLICATIONS 1,186,363  4/1970  Great Britain

OTHER PUBLICATIONS

IBM Technical Disclosure Bulletin Vol. 6, No. 8 pp. 31–32, 1/1964. Switch Voltage Regulator– Menard et al.
General Electric Controlled Rectifier Manual, First Edition, pp. 112– 113, 1960

*Primary Examiner*—Lewis H. Myers
*Assistant Examiner*—H. Huberfeld
*Attorney*—Arnold E. Renner, James C. Davis, Jr., Frank L. Neuhauser, Oscar B. Waddell and Joseph B. Forman

[57] ABSTRACT

A control circuit for controlling the effective power to a load from a power source of substantially constant direct current voltage includes a first or main solid state switching device for placing the load and the power source in series. Suitable circuitry including a commutating capacitor chargeable in a direction such that its discharge will terminate conduction of the main switching device further includes resistive means serving to maintain the capacitor in constant communication with the power source. Also provided is a means for providing dynamic braking of a direct current motor load through a resistive element such that the armature terminal voltage is adjusted linearly with the speed thereof.

14 Claims, 2 Drawing Figures

Patented April 11, 1972

INVENTOR.
CHARLES E. KONRAD
BY

DIRECT CURRENT CONTROL CIRCUIT

BACKGROUND OF THE INVENTION

The present invention relates generally to a control circuit for varying the effective power from a direct current source to an appropriate load and more particularly to a control circuit for varying the effective power to a series direct current motor through the control of the amount of time during which the motor and source are connected together. This may be achieved by varying the frequency of the pulses supplied to the load, by varying the width of the pulses or by some combination of both these methods.

It is known in the prior art that the amount of power which can be supplied to a load, such as direct current motor, from a substantially constant direct current voltage source may be varied by connecting and disconnecting the load to and from the source. The effective amount of power supplied to the load will vary in accordance with the percentage of time that the load and source are connected. It is also known in the prior art to use a solid state switching device, which may be switched at a selected frequency to provide this varying amount of power. The solid state switching devices normally used in applications of this nature are those known as thyristors; the most common of which is the silicon controlled rectifier described in "SCR Manual 4th Edition" by General Electric Company, Copyright 1967 by General Electric Company. Thyristors are rendered conductive by the simultaneous application of a forward voltage bias and a gating signal. Once conduction is established the gating signal may be removed and conduction will continue until a zero or negative voltage bias is applied to the thyristor terminals.

One example of a motor control circuit embodying the type of control just described is found in U.S. Pat. No. 3,335,351, "DC Motor Control Circuit" by H. E. Morris and assigned to the assignee of the present invention. In this patent the motor is controlled through a main thyristor, specifically a silicon controlled rectifier (SCR) which is gated to the on or conductive state by the application to its gating terminal of a pulse from a variable frequency oscillator. This thyristor (SCR) is rendered nonconductive by way of energy stored in a suitable commutating capacitor which is allowed to discharge in the direction opposite to that to which the thyristor normally conducts. This control is highly typical of that presently in use for electrical vehicles. This type of control is, for the most part, quite satisfactory, particularly when compared to the previous methods utilizing variable resistors, in that the large bulk of the power consumed is within the motor itself and not dissipated in a large resistor bank. It is, however, to be realized that in the controls of the type with which we are here concerned the conservation of even small amounts of energy is highly important. This is particularly true in the case of electrical vehicles where the sole source of power consists of storage batteries carried by the vehicle itself. In this particular application it is highly desirable that losses attributable to various circuit components be held to an absolute minimum.

One common problem in present day thyristor controls is that the main thyristor connecting the motor to the battery is in the circuit for charging the capacitor subsequently used to terminate conduction of the main thyristor. Even though thyristors are not normally considered as resistive devices, they do have some internal resistance and hence produce some loss in the system. Closely coupled to the loss problem is the problem surrounding the current carrying capacity of a given thyristor. Each thyristor type is limited in the amount of average current capability by internal heating effects. Thus, currents in addition to the motor current carried by the thyristor will reduce its ability to carry increased motor current.

An additional problem concerns the manner in which a thyristor begins conduction. In devices of this nature, the gating electrode is a point contact on the base material. When a gating pulse is supplied to the thyristor, conduction begins at that point contact and spreads out across the whole of the base material of the device. It is not until such time as the entire base material is conducting that the thyristor is capable of carrying its full rated current. The normal result of full rated current being applied to a thyristor prior to its reaching its fully conductive state is the destruction of the device. Therefore, any action which can be taken to limit the initial current in the thyristor will lead to a potentially longer life.

In many prior art control circuits the commutating capacitor is charged only during that period of time when the main circuitry is operative. In electric vehicles, for example, there is normally included a shorting switch which bypasses the control circuitry and places the motor directly across the battery in order to apply full power to the motor. It is conceivable, if one were to suddenly go from a full power situation involving the shorting switch to one of normal control, that the commutating capacitor would not be allowed sufficient time to charge and hence the commutation of the main power thyristor at the proper time would not be affected.

When the load of the control circuit is a motor, it is known in the prior art to provide a suitable braking by a system normally termed dynamic braking. This amounts to the reversal of the relative current directions in the armature and field of the motor such that when the motor is in a coasting condition the motor acts as a generator with the polarity reversed. In systems of this nature, two diodes are used; one short-circuiting the armature and the second short-circuiting the armature and the field of the motor. The diode short-circuiting the armature allows the generator voltage to be dropped across the armature to produce the dynamic braking effect. Diode short-circuiting both the armature and the field serves to maintain the flow of current and to reduce the amount of ripple occurring. A system such as has just been described is shown in the U.S. Pat. No. 3,344,328, "Direct Current Motor Plugging Circuit" by H. E. Morris, assigned to the assignee of the present invention. In a limited number of situations this system presents certain erraticisms during braking in that the maximum braking effect is achieved at most rapid speeds because the maximum armature current occurs with the highest speed. This combination can, in turn, result in arcing at the motor brushes as well as a decided jerk due to the rapid deceleration when braking of the motor is initiated.

SUMMARY OF THE INVENTION

The foregoing deficiencies of the prior art are alleviated by the control system of the present invention which provides that the storage means or commutating capacitor utilized to render the main switching device nonconductive is provided in a circuit which is parallel to the main switching device. Thus, it is possible to provide means for charging this capacitor independently of the main switching device such that the device will not carry current required to charge the capacitor. This configuration reduces the heating problem within the thyristor (device) with the accompanying decrease in the amount of power wasted. This configuration also overcomes the current surge problem common in prior art controls by allowing the current to build up slowly so that the entire base material of the thyristor is conductive by the time heavy currents are present. (It should be remembered that the normal current profile in an inductive circuit such as a motor begins at a low value and increases exponentially while that in the capacitor, with respect to a direct current pulse, initially appears as a near short-circuit with the current slowly decaying.)

The assurance of having the commutating capacitor charged at all times is achieved by providing a resistive connection in series with the commutating capacitor and to connect this series combination directly across the direct current power source. Thus, the commutating capacitor is at all times in communication with the direct current source and hence will never have a charge in its static state which is less than the voltage of the source. The circuit of the present invention also provides additional means to regulate the amount of power applied to the motor during braking periods to maintain a substantially constant armature current.

It is, therefore, an object of the present invention to provide an improved control circuit for varying the power supplied from a direct current source to a load.

A further object is to provide a control circuit for the regulation of power supplied to a series direct current motor.

It is a further object to provide a motor control circuit which results in minimum power consumption while assuring the proper commutation of the load current.

A still further object is to provide a control circuit for a direct current motor in which a more positive control of the motor is accompanied by an improved means for applying a braking action to the motor.

DESCRIPTION OF THE DRAWINGS

The foregoing and other objects of the present invention will become apparent as the following description proceeds and features of novelty which characterize the invention will be pointed out in particularity in the claims affixed to and forming a part of this specification. For a better understanding of this invention, reference is made to the accompanying drawings in which:

DETAILED DESCRIPTION

Figure 1:
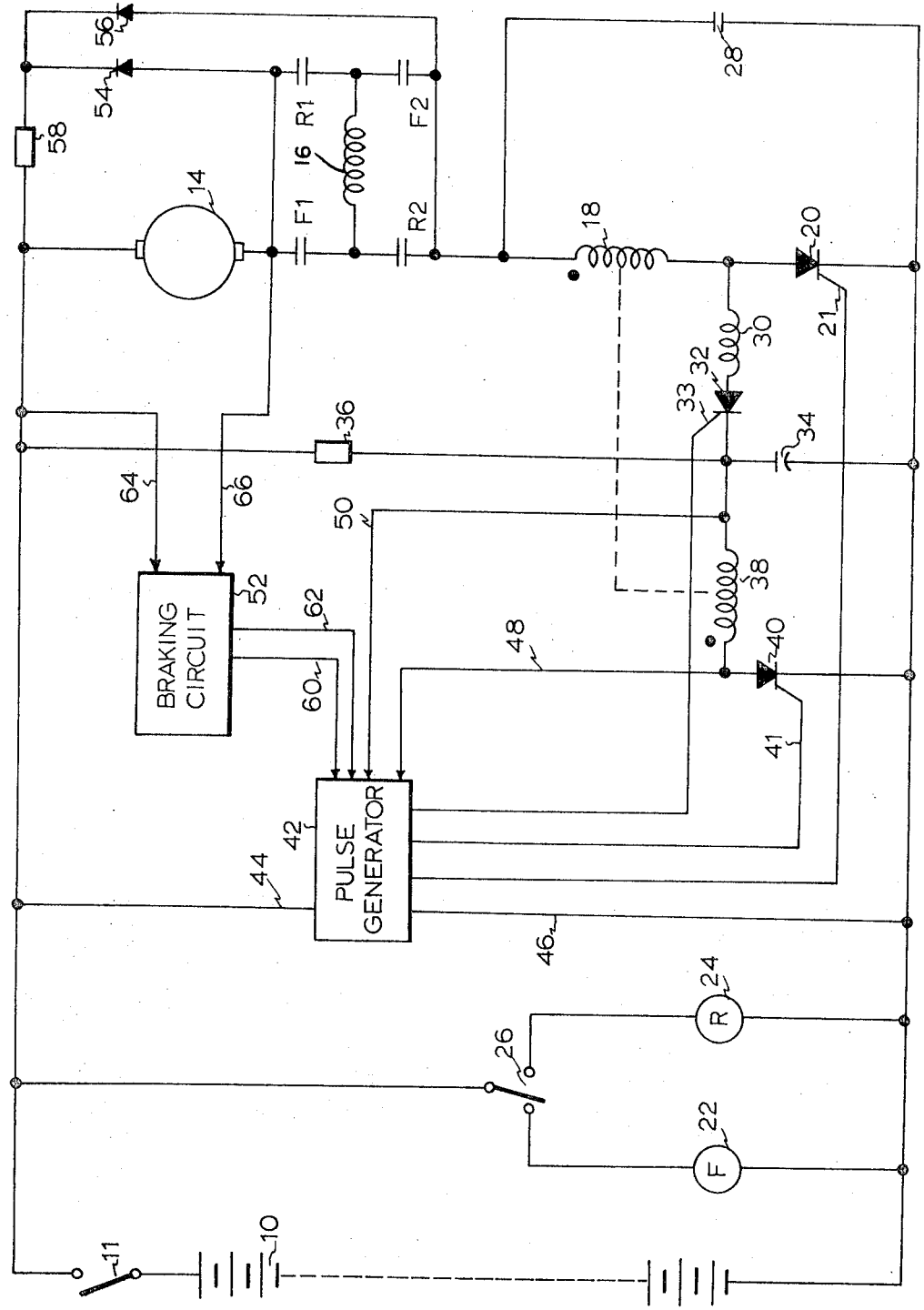
FIG. 1 is a schematic drawing illustrating the present invention in its preferred embodiment; and, FIG. 2 is a detailed schematic drawing of certain elements of FIG. 1 which are illustrated therein in block form.

Referring now to FIG. 1, there is shown a suitable source of direct current power 10 illustrated as a battery disposed with its positive terminal at the top and its negative terminal at the bottom. A master switch 11 serves to connect and disconnect the source from the rest of the circuit. In a series loop with the battery is a series direct current motor having an armature 14 and a field winding 16. The direction of the current through the field winding 16 is governed by the relative condition of four contacts F1, F2, and R1, R2 as will be hereinafter described. Completing the series loop is a transformer primary 18 and a solid state switching device 20 connected with its anode to the free side of the transformer primary and its cathode to the negative terminal of the battery 10. Switching device 20 may be any suitable type but preferably, as illustrated, is that of the type generally belonging to the class known as thyristors (the most common type of thyristor being the silicon controlled rectifier). As such, thyristor 20 includes a gating terminal 21 to which a gating pulse may be applied to initiate conduction.

The direction of current through the motor field winding 16, and hence the direction of torque resulting from applied power, is determined by two pairs of switch contacts F1, F2, and R1, R2. Upon closure of the F1 and F2 contacts, current from the source 10 will flow in the winding 16 in a first direction (left to right) while actuation of contacts R1 and R2 will result in the flow of current from the source 10 in the opposite direction, that is from right to left as illustrated. Operation of the contact pairs F1, F2 and R1, R2 is under respective control of an F coil 22 and an R coil 24, each of which may be selectively connected across the battery 10 by means of a selection switch 26. That is, when the switch is closed to the left, as shown in FIG. 1, the F coil is energized, causing contacts F1 and F2 to close. Conversely, when the switch 26 is connected to the right, the R coil 24 is energized, closing contacts R1 and R2. The F and R designations indicate respectively the arbitrary selection of forward and reverse directions derived by the motor torque from power applied to the motor.

Thyristor 20 is the main power thyristor and during operation of the motor the effective power delivered thereto, in either the forward or reverse direction, is governed by the ratio of on to off time during which the thyristor 20 is in its conductive state. Connected across the transformer primary 18 and the thyristor 20 is a short-circuiting contactor 28 which, when closed, serves to place the motor directly across the battery 10 to provide maximum power to the motor in a manner well-known in the art.

In parallel with the main power thyristor 20 is a commutating circuit including an inductance 30, a second solid state switching device 32, which device may also be a thyristor having a gating connection 33, and a suitable storage means for electrical energy, for example a commutating capacitor 34. Inductance 30, in the present embodiment, provides a choke effect to limit the initial current surge when this portion of the circuit is rendered conductive. Thyristor 32 is connected anode to anode with thyristor 20. The cathode of thyristor 32 is connected to the upper plate of the capacitor 34. The lower plate of capacitor 34 is connected to the negative terminal of the battery 10. A resistor 36 joins the positive bus of the system to the junction of the thyristor 32 and capacitor 34. This resistor serves as a link of continuous communication between the positive terminal of the battery and the upper plate of the capacitor 34 whereby the capacitor 34 retains a minimum charge under specified operating conditions as will be hereinafter described.

A charge reversing circuit including a transformer secondary 38 (secondary of primary winding 18) and a third solid state switching device or thyristor 40 is connected in parallel with the capacitor 34. Thyristor 40 includes a gating connection 41. In the preferred embodiment illustrated, the primary 18 and secondary 38 are separate windings, inductively coupled.

The gating connections 21, 33, and 41 of the thyristors 20, 32, and 40, respectively, are connected to a pulse generator 42, shown in FIG. 1 in block form, the details of which will be described in greater detail with respect to FIG. 2. Pulse generator 42 is supplied with power via leads 44 and 46 which are connected respectively to the positive and negative terminals of the battery 10. Additional inputs to the pulse generator 42 include leads 48 and 50 which are connected respectively to the opposite terminals of the transformer secondary 38 providing input signals to the pulse generator 42 as will be hereinafter described. The last two inputs 60 and 62 to the pulse generator 42 are from a braking circuit 52 which will be described with respect to the braking function of the system of the present invention.

Before proceeding with a detailed description of the circuit operation, it is believed advantageous to state that the transformer flux convention to be used in this discussion is that of a positive flux generation from current into the polarity dot and negative flux generation from current out of the polarity dot.

Assume first, for purposes of this discussion, that this is an initial operation and that there is no residual charge on the capacitor 34 and that all of the thyristors are in the nonconductive state. With the closing of the master switch 11, power is supplied from the battery 10 via leads 44 and 46 to the pulse generator 42 and to the capacitor 34 by way of the resistor 36 allowing capacitor 34 to charge to battery voltage with its upper plate positive. Selector switch 26 is now actuated to either the F or R position to operate the appropriate contacts with respect to the field winding 16. For purposes of this illustration, it is assumed that the switch 26 is positioned to the left, thus energizing the F coil 22 and closing contacts F1 and F2. Inasmuch as all of the thyristors are still in the nonconductive state, however, no current will exist through the motor at this time. A pulse is now supplied by the pulse generator 42 via gating connection 21 to gate thyristor 20 to the conductive state. After a short delay, by way of gating connection 41, thyristor 40 is rendered conductive. At this instant in time, a voltage very nearly equal to the battery voltage is applied across the motor armature 14 and field 16 resulting in a motor current whose rate of increase is determined almost entirely by the motor inductance and resistance. (In the event the motor is turning because of prior operation the generated voltage of the motor will also affect the rate of motor current increase.)

Because thyristor 40 is now conductive, the charge on capacitor 34 (positive at the top plate) will generate a current through the transformer secondary 38 and will drive the transformer toward negative saturation. (It will be remembered that, by definition, negative flux was defined as current out of the polarity dot.) When transformer reaches negative saturation and its impedance is essentially that of an air core inductance, the current in the loop comprising the capacitor 34, transformer secondary 38 and thyristor 40 will rise sharply and resonantly reverse the remaining initial capacitor charge resulting in a capacitor charge which is positive at the lower plate. By this time the load (motor) current will have increased in value and its passage through the transformer primary winding 18 will drive the transformer toward positive saturation. As the transformer moves toward positive saturation, the voltage across the secondary 38 which is positive at the dot, will force the existing charge on the capacitor (now positive on lower plate) to a higher value. The charge on the capacitor at this period of time of circuit operation normally exceeds battery voltage with the lower plate being positive.

When, due to the load current, the transformer saturates in the positive direction, the voltage induced across the secondary 38 will collapse and the capacitor 34 will tend to neutralize its charge by forcing a reverse current through the thyristor 40 in the reverse direction (clockwise). This biasing of thyristor 40 will commutate (turn off) its conduction and the thyristor will be rendered nonconductive. The reversal of the voltage across the transformer secondary 38 which occurs in that a small amount of time during which current flows in a clockwise direction is sensed, via leads 48 and 50, by the pulse generator 42 which in response thereto develops a pulse which is applied to the gating connection 33 of thyristor 32 placing that thyristor in the conductive state. The voltage on the capacitor 34 (positive at bottom plate) is now pressed across the main power thyristor 20 in a direction opposite to its conduction thus forcing the anode of that thyristor to zero and rendering it nonconductive.

When thyristor 20 ceases to conduct, the load or motor current is diverted through thyristor 32 and the commutating capacitor 34. The load inductance plus the air core inductance of the saturated transformer primary 18 forms an under-damped circuit which will cause the capacitor to ring resonantly such that the capacitor is charged above battery voltage (positive to top plate). Because the charge on the capacitor 34 exceeds and opposes the battery voltage the capacitor will attempt to discharge back through the commutating thyristor 32 forcing its cathode positive and causing the thyristor 32 to cease conduction.

With each of the thyristors again in the blocking state, capacitor 34 will begin to discharge to battery voltage through the resistor 36 at a rate governed by the RC time constant of the circuit. The amount of discharge of the capacitor 34 will, of course, depend upon the amount of time between the commutation of thyristor 32 and the next gating of thyristor 40. The system has now completed one complete power cycle and the pulse generator 42 will next provide the next pulses to thyristors 20 and 40 to initiate the subsequent cycle. As indicated, the timing of the next cycle is dependent upon the desired amount of power to be supplied to the load. In the situation of a motor load; for example, as an electric vehicle, the pulse frequency and/or width would be determined through a speed control mechanism.

During the interpulse period, when battery power is not supplied to the motor, the current of the motor due to generated voltage will be diverted through a pair of rectifiers (diodes) 54 and 56 connected, respectively, as follows. A resistor 58 is connected to the upper terminal of motor armature 14, the other end of the resistor 58 being connected to cathodes of the diodes 54 and 56. The anode of diode 54 is connected to the other terminal of the armature 14 while the anode of the diode 56 is connected to the free end of the field 16. Thus, when the motor is deenergized with respect to the source 10, diode 54 carries the armature current while diode 56 carries the motor current minus the armature current. During periods of non-power application to the motor, the motor current will begin to decay on the natural time constant of the field and the armature. During normal operation, however, the frequency of power application is great enough compared to the time constant of the motor that the amount of motor current decay is small, thus minimizing ripple components.

The system is now in condition for the second pulse operation which will be substantially that as described with a few minor differences. Specifically, at the next gating of the main power thyristor 20, the commutating capacitor will be charged above battery potential (assuming there has not been sufficient time between adjacent pulses to allow the capacitor to discharge completely to battery voltage). In this situation when the main power thyristor 20 is again gated its anode current will rise almost instantly to the level of motor current, allowing the motor current to build up to a higher value than previously achieved and resulting in a somewhat higher commutating voltage being developed on the commutating capacitor 34 when the lower plate is positive. Upon subsequent cycles these changes will continue until a steady state condition is reached and which is determined by several variables including the vehicle speed, the pulse width and the pulse rate as applied to the thyristor 20.

Brief mention was previously made of the shorting contact 28 which is closed when it is desired to apply battery voltage to the load (motor). In the case of an electric vehicle this contactor is normally closed by means of the acceleration control when it is desired to maintain the motor operation at full speed or, for example, when the vehicle is stuck in a "chuckhole" and a maximum torque is required. Contactor 28 is not interconnected, with respect to time, with any of the other components of the circuit. There exists, therefore, no way in the prior art of assuring that at the time contactor 28 is opened and control is returned to that part of the system involving the pulse generator that the commutating capacitor will be charged to the necessary degree required for turning off or commutating the thyristor 20 at the appropriate time. This problem is alleviated in the circuit of the present invention by the inclusion of the resistor 36 which maintains the battery in communication with the capacitor 34 at all times of system operation. Hence, the minimum charge retained by capacitor 34 is that of battery voltage on its upper plate thus assuring commutation of thyristor 20 during the first cycle after the opening of contactor 28.

Figure 2:
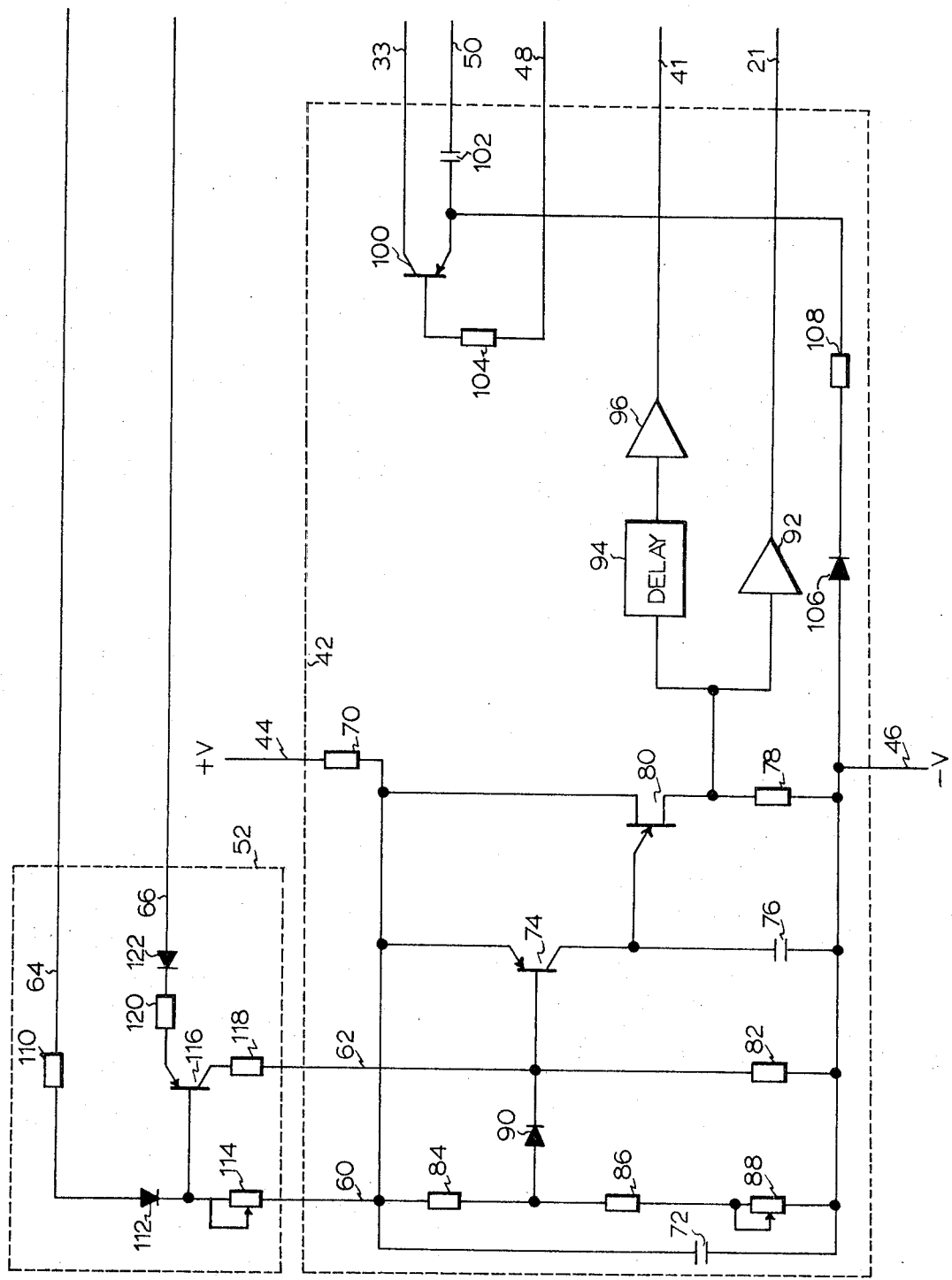

Referring now to FIG. 2, there is shown in greater detail the pulse generator 42 and braking circuit 52 illustrated in block form in FIG. 1. For purposes of simplicity, inasmuch as the details of these two circuits do not form a direct part of the invention, these elements are shown in their basic form to provide the essential functions necessary to the proper operation of the circuit of the present invention. In FIG. 2 connection 44, coming from the positive battery terminal, leads to a resistor 70 in series with a capacitor 72. These two elements collectively form a power supply to provide a voltage lower than battery voltage for the pulse generator. The other side of capacitor 72 is connected via line 46 to the negative side of the battery. The heart of the pulse generator, that which provides the gating signal for the thyristors 20 and 40 (FIG. 1) is an oscillator of the relaxation type which comprises a transistor 74, a capacitor 76, a resistor 78 and a unijunction transistor 80. This relaxation oscillator is of the variety known in the art with the emitter of the transistor 74 being connected to the low voltage side of resistor 70 and its collector forming the base input to the unijunction transistor 80. The other two connections to the unijunction transistor 80 are to the junction of the emitter of the transistor 74 with the resistor 70 and to resistor 78, the other side of which joins to the negative terminal of the battery.

The pulse rate of a relaxation oscillator such as that illustrated is a linear function of the collector current of the transistor 74. This current is governed by the voltage appearing across a resistor 82 connected between the transistor base and the negative bus. The voltage across resistor 82 is in turn controlled by two fixed resistors 84, 86, and a variable resistor 88. In the case of an electric vehicle, resistor 88 would be actuated by the accelerator control of the vehicle. Resistors 84, 86, 88 collectively form a voltage divider with the resistor 82 being in parallel with the two resistors 86 and 88 and connected thereto by means of a rectifier 90 which joins the union of resistors 84 and 86 to the common junction of the base of the transistor 74 and the resistor 82.

The output of the relaxation oscillator is taken from a terminal of the unijunction transistor 80 and passed through a suitable amplifier 92, the output of which forms the gating signal to the gating connection 21 of thyristor 20. The same output from the unijunction transistor 80 is also passed through a suitable delay 94, the output of which forms an input to a second amplifier 96, the output of which is applied to the gating connection 41 of thyristor 40. The amount of time provided by the delay 94 will, of course, be dependent upon the various parameters of the entire system but in practice it is normally about 10 microseconds. In any case the time delay is sufficient to insure that thyristor 20 is fully conductive before thyristor 40 is gated to the conductive condition.

Also included within the pulse generator 42 is a gating circuit for the commutating thyristor 32 (FIG. 1). As shown in FIG. 2, this gating circuit is comprised of a transistor 100, the collector of which is connected to the gating connection 33 to the thyristor 32. The emitter of transistor 100 has an input via line 50 by way of a capacitor 102. Line 50 is connected to one side of the transformer secondary 38 as shown in FIG. 1. Line 48 which is connected to the other side of the transformer secondary 38 provides a signal applied through resistor 104 to bias the base of transistor 100. A rectifier 106 and a limiting resistor 108 serve to join the emitter of the transistor 100 to the negative terminal of the battery by way of line 46.

In operation when the transformer is saturating in the positive direction as previously explained, a current path is established from the left side of the secondary 38 through thyristor 40 to the negative bus of this system (FIG. 1) through the diode 106, resistor 108, capacitor 102 and through lead 50 to the right side of the secondary 38. This current charges capacitor 102 in a direction such that that plate (left plate in FIG. 2) connected to the emitter of transistor 100 is positive. When the transformer saturates and the voltage across the secondary collapses with the resultant tendency of reverse current therethrough as previously explained, capacitor 34 (FIG. 1), which at this time is charged with its lower plate positive, will act as a voltage source. Current from this source will flow through the diode 106 and resistor 108 establishing an emitter to base current within transistor 100. This emitter to base current flows through resistor 104, line 48 and the transformer secondary to the upper plate of capacitor 34. Transistor 100 is thus rendered conductive and the charge on capacitor 102 will supply a collector current or signal which is applied to the gating connection 33 of commutating thyristor 32 to render that thyristor conductive.

For a better understanding of the braking operation of the system of the present invention, reference is once again made to FIG. 1 in conjunction with the more detailed portion of the braking circuit 52 as shown in FIG. 2. It will be initially assumed that the truck is driving in the forward direction such that the contactors F1 and F2 are closed and contactors R1 and R2 open. With the main power thyristor 20 conducting, current will be from the positive terminal of the battery 10, through the motor armature 14, from left to right through the field winding 16, then through the transformer primary 18 and the main thyristor 20 to the negative side of the battery. Under these conditions the voltage generated by the armature conductors cutting the lines of field flux is positive at the upper terminal of the armature. If it is now desired to decelerate or to brake the motor, switch 26 is moved to connect the R coil 24 across the battery, thus opening contacts F1, F2 and closing contacts R1, R2. With subsequent pulsing of the main thyristor 20, it is seen that the current path is the same as that previously described with the exception that the current due to the power from the battery is directed through the field winding 16 in a direction opposite to that previously described. That is, the current in the field winding due to applied power will be from right to left as shown in FIG. 1, thus reversing the field flux. However, in that the motor armature is still rotating in the forward direction due to the inertial effects of the system, the generated voltage by the armature will now be reversed; i.e., positive at the bottom terminal of the armature 14. With the generated voltage of the armature 14 positive at the lower terminal, the series combination of diode 54 and resistor 58 essentially short-circuits the generated voltage and the current due to that generated voltage circulates in the loop comprising the armature 14, diode 54 and resistor 58 and be limited only by the respective resistances of those three elements.

As before indicated, in order to regulate the dynamic braking effect and derive a relatively soft deceleration characteristic, it is desirable to maintain a relatively constant armature current during the braking period. This is achieved through the use of the braking circuit 52 which is shown in greater detail in FIG. 2. Circuit 52 serves to turn the pulse generator 42 off during those periods of time during which the current exceeds a predetermined or desired level.

Before providing a detailed description of the braking circuit 52, however, a basic explanation of system operation during this period of time is believed warranted.

In the typical dynamic braking situation, during the braking interval the field current is initially at a minimum value and will increase with a decrease in motor speed to maintain a constant armature current until the field current and the armature current are equal. At this point in time, which is typically less than 10 percent of full speed, the diode short-circuiting the armature will cease to conduct and the circuit will achieve a classic plugging operation as is well-known in the art. Referencing now FIG. 1, applying Kirchhoff's law to the circuitry involving the armature 14, field winding 16, diodes 54, 56 and resistor 58, it is seen that at the beginning of the braking interval when the armature speed is high the field current necessary to maintain the desired level of armature current is relatively small, the current through diode 54 is many times greater than that through diode 56. As a result of the voltage drop produced by the current through the diode 54, a portion of the armature current may be forced through the field winding 16 and result in a regenerative effect whereby the armature current begins to increase in an uncontrollable fashion until the motor saturates. It has been found that this regenerative effect can be prevented in a particular motor by assuring that the product of the armature resistance and the field resistance is greater than the product of the dynamic resistance of the diode times the voltage constant (K) of the motor (this value K is a constant for a given motor at a given speed). This relationship can be expressed as:

$$R_A R_F > R_d K$$

In light of this expression the addition of resistor 58 in series with the armature and the parallel diodes 54 and 56 will stabilize the motor characteristics. Placement of the resistor 58 as shown in series with the armature is advantageous in that the armature resistance is normally greater than the field resistance and any given resistance placed as indicated will have the greater overall effect. It is, however, realized that the conditions established by the expression given above can be satisfied by adding a larger resistor in series with the field winding.

In that a constant armature current is desired, regulation of that current will require a signal which is proportional to that current. In the present embodiment this signal is derived by obtaining the voltage across the series arrangement of diode 54 and the resistor 58. The signals are applied to the braking circuit 52 by way of leads 64 and 66. With specific reference to FIG. 2, lead 64 is connected to one side of a resistor 110, the other side of which is connected to and forms an input to the anode of a rectifier (diode) 112. The output of diode 112 forms one input to a variable resistor 114, the other side of which is connected via line 60 to the resistor 84 in the pulse generator 42. The output of diode 112 also forms the base input to a transistor 116 having its collector connected to a resistor 118, the other end of which is connected via line 62 to the base of transistor 74 of the relaxation oscillator of the pulse generator 42. The emitter of transistor 116 forms an input to a resistor 120, the output of which is connected to the cathode of a rectifier or diode 122, the anode of which is connected via line 66 to the other armature terminal. Transistor 116 adjusts the current in that circuit segment which extends from the positive bus (upper terminal of armature 14) via line 64 through resistor 110, diode 112 and resistor 114 to resistor 84 in the pulse generator 42. Because the voltage at the upper terminal of resistor 84 is a fixed voltage and because the battery voltage is also fixed, the voltage between the positive bus and the lower end of resistor 114 is a fixed value. By adjusting the value of the resistance 114, the voltage across resistor 110 can be adjusted which in turn presets the voltage on the base of transistor 116 to a predetermined level. This voltage is set at a level which will allow the emitter to base circuit to become forward-biased when the voltage at the lower terminal of the armature 14 is at a proper level with respect to voltage at the upper terminal of the armature; that is, when the voltage across the armature divided by the total resistance of the circuit loop of armature diode 54 and resistor 58 equals the desired current.

When the desired current level is reached, the voltage at the lower terminal of armature 14 is more positive than that at the base of transistor 116 and current flows through diode 122, resistor 120, and through the emitter to base circuit of transistor 116, turning that transistor on. With the turning on of transistor 116, the voltage at the lower terminal of armature 14 (less the voltage drop due to the diode 122, resistor 120 and resistor 118) is applied to the base of transistor 74 at the relaxation oscillator portion of the pulse generator 42. Resistors 120 and 118 are chosen with respect to resistor 82 of the pulse generator 42 such that the base of transistor 74 is made more positive than the emitter and therefore while transistor 116 is conducting transistor 74 cannot conduct. Thus, no current will be supplied to capacitor 76 in the relaxation oscillator preventing its voltage from increasing which in turn prevents the unijunction transistor 80 from producing a pulse for application to the connection 21 of thyristor 20 (FIG. 1). With the main thyristor 20 not being gated, no additional power can be supplied to the motor and the voltage generated therein will therefore tend to decrease. Upon reaching the desired voltage level, the blocking effect of the braking circuit on the pulse generator will cease and the relaxation oscillator of the pulse generator will be effective once to render the main power thyristor 20 conductive. Thus, a substantially constant armature current is maintained during the braking interval which will produce the required soft braking action.

While it is apparent that the value of the several components utilized in the system described will vary greatly according to the voltage of the source and the particular motor utilized, the following table sets forth typical values for components in the power circuit for a series direct current motor having the indicated constants.

| Item | Value |
|---|---|
| Motor | |
| Stall current | 1000 a. |
| Armature resistance | 0.006 ohms |
| Armature inductance | 0.2 mh |
| Field resistance | 0.01 ohms |
| Field inductance | 3.5 mh |
| Resistor 36 | 2.7K ohms |
| Resistor 58 | 0.0007 ohms |
| Thyristor 20 | GE Type C185 |
| Thyristor 32 | GE Type C46 |
| Thyristor 40 | GE Type C35 |
| Rectifier 54 | GE Type A70 |
| Rectifier 56 | GE Type A70 |
| Capacitor 34 | 150 microfarads |
| Transformer | |
| Primary turns | 3 |
| Secondary turns | 52 |
| Battery | 36 volts |

While the foregoing description has been directed primarily to the control of a direct current motor, it will be immediately obvious to those skilled in the art that the present invention is not so limited and the appended claims are, therefore, intended to cover the full spirit and scope of the present invention.

What is claimed is:

1. A circuit for controlling the amount of power delivered to a load from source of substantially constant direct current voltage comprising: a series circuit including said source, said load, a first transformer winding and a first solid state switching device, said first device serving to control the effective power supplied to said load by varying the amount of time said series circuit is conductive; means to render said first device conductive; a commutation circuit comprising a series arrangement of a capacitor and a second solid state switching device, said commutation circuit connected in parallel with said first solid state switching device; and a reversing circuit including a second transformer winding in series with a third solid state switching device, said reversing circuit connected in parallel with said capacitor whereby said capacitor may be charged in a direction to commutate said first solid state switching device.

2. A circuit in accordance with the provisions of claim 1 in which said first, second and third solid state switching devices are thyristors.

3. A circuit in accordance with the provisions of claim 1 in which said load is a direct current motor having a series field winding.

4. A circuit in accordance with the provisions of claim 2 in which said load is a direct current motor having a series field winding.

5. A circuit in accordance with the provisions of claim 1 in which the means rendering said first device conductive also serves to render said second and third devices conductive.

6. A control circuit for varying the effective power supplied to a load from a source of substantially constant direct current voltage, said circuit comprising: a first circuit loop including the series arrangement of said source, said load, a first transformer winding and a first solid state switching device selectively variable between a conductive state and a nonconductive state to deliver power from said source to said load in proportion to the amount of time said first solid state switching device is conductive; means including a pulse generator to supply a gating signal to said first switching means to place said first switching means into its conductive state; a second circuit loop comprising a second solid state switching device and a capacitor in series therewith, said second circuit loop connected in parallel with said first solid state switching device; and a third circuit loop including a second transformer winding and a third solid state switching device connected in series, said third circuit loop connected in parallel with said capacitor.

7. A circuit in accordance with the provisions of claim 6 in which said first, second and third solid state switching devices are thyristors.

8. A circuit in accordance with the provisions of claim 6 in which said load is comprised of a direct current motor.

9. A circuit in accordance with the provisions of claim 7 in which said load is comprised of a direct current motor.

10. A circuit in accordance with the provisions of claim 6 in which the second and third switching devices are variable between a conductive and a nonconductive state and in which said pulse generator also serves to supply respective signals to render said second and third devices conductive.

11. In a battery powered electrical vehicle driven by a direct current motor, a circuit for controlling the amount of power supplied to said motor comprising: a main power circuit including a battery, the motor, a transformer primary winding and a first thyristor all in series; a source of variable frequency pulses for supplying signals to said first thyristor whereby said thyristor may switch from a blocking to a conducting state; a commutating circuit comprising a series arrangement of a second thyristor and a commutating capacitor, said commutating circuit connected in parallel with said first thyristor; a reversing circuit including a transformer secondary and a third thyristor in series with said secondary, said reversing circuit connected in parallel with said capacitor; means connecting said source with said third thyristor whereby pulses derived from said source may render said third thyristor conductive to effect the charging of said capacitor in a second direction opposite to that first imposed; and means responsive to a prescribed voltage across said transformer secondary to produce a signal to switch said third thyristor into a conductive state completing a circuit loop comprising said first and second thyristors and said capacitor whereby the second direction charge on said capacitor serves to render said first thyristor nonconductive.

12. The invention in accordance with the provisions of claim 11 in which said motor includes an armature winding and a series field winding and further including means selectively operable to reverse the relative direction of current with said armature and field windings.

13. The invention in accordance with the provisions of claim 11 further including means to provide dynamic braking to said motor.

14. The invention in accordance with the provisions of claim 12 in which the primary and secondary transformer windings are separated and directly coupled by inductive effect only.

* * * * *